US009529735B2

(12) United States Patent
Hashimoto

(10) Patent No.: US 9,529,735 B2
(45) Date of Patent: *Dec. 27, 2016

(54) SECURE DATA ENCRYPTION IN SHARED STORAGE USING NAMESPACES

(71) Applicant: KABUSHIKI KAISHA TOSHIBA, Tokyo (JP)

(72) Inventor: Daisuke Hashimoto, Cupertino, CA (US)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/978,996

(22) Filed: Dec. 22, 2015

(65) Prior Publication Data

US 2016/0110295 A1 Apr. 21, 2016

Related U.S. Application Data

(63) Continuation of application No. 14/081,796, filed on Nov. 15, 2013, now Pat. No. 9,245,140.

(51) Int. Cl.
*G06F 12/14* (2006.01)
*G06F 21/62* (2013.01)
*G06F 9/455* (2006.01)
*G06F 12/02* (2006.01)
*G06F 21/78* (2013.01)
*H04L 9/08* (2006.01)

(52) U.S. Cl.
CPC ....... *G06F 12/1408* (2013.01); *G06F 9/45533* (2013.01); *G06F 12/0238* (2013.01); *G06F 12/145* (2013.01); *G06F 12/1466* (2013.01); *G06F 21/6209* (2013.01); *G06F 21/6218* (2013.01); *G06F 21/78* (2013.01); *H04L 9/0816* (2013.01); *G06F 2212/1052* (2013.01); *G06F 2212/402* (2013.01); *G06F 2212/7201* (2013.01)

(58) Field of Classification Search
CPC ................ G06F 2221/2107; G06F 2221/2147; G06F 12/1408; G06F 12/78; G06F 12/1441; G06F 3/0659; G06F 3/061; G06F 3/0614; G06F 3/0637; G06F 2009/45579; G06F 21/00; H04L 63/08; H04L 63/101; G11B 20/00246
USPC ........... 710/2, 5; 726/27; 713/193, 189, 165; 711/163
See application file for complete search history.

(56) References Cited

U.S. PATENT DOCUMENTS

| | | | |
|---|---|---|---|
| 5,995,624 A | * | 11/1999 | Fielder .................. H04L 9/0822 380/283 |
| 8,200,965 B2 | | 6/2012 | Fujibayashi et al. |
| 8,364,983 B2 | | 1/2013 | Rangegowda et al. |
| 8,423,795 B2 | | 4/2013 | Kawakami |
| 2004/0255137 A1 | | 12/2004 | Ying |
| 2007/0101134 A1 | | 5/2007 | Parlan et al. |
| 2007/0180210 A1 | | 8/2007 | Thibadeau |

(Continued)

*Primary Examiner* — Brian Shaw
(74) *Attorney, Agent, or Firm* — Patterson & Sheridan, LLP

(57) ABSTRACT

A data storage device in a distributed computing system has physical block addresses that are each allocated to multiple namespaces. To access the data storage device, a host system issues a command to the data storage device that includes an access key and a virtual block address to be accessed. The data storage device converts the virtual block address to a physical block address of the data storage device using a mapping associated with the access key. Access to a physical data block associated with a particular namespace is granted only if an access key for that namespace is provided to the data storage device.

13 Claims, 6 Drawing Sheets

(56) References Cited

U.S. PATENT DOCUMENTS

| | | |
|---|---|---|
| 2008/0016373 A1 | 1/2008 | Yagawa |
| 2009/0282266 A1 | 11/2009 | Fries et al. |
| 2009/0300356 A1 | 12/2009 | Crandell |
| 2011/0072276 A1 | 3/2011 | Lee et al. |
| 2013/0031366 A1 | 1/2013 | Simske et al. |
| 2013/0223628 A1 | 8/2013 | Cho et al. |
| 2014/0181985 A1* | 6/2014 | Mamidwar ............ G06F 21/10 726/26 |
| 2014/0325013 A1* | 10/2014 | Tamir .................... G06F 15/167 709/212 |

* cited by examiner

SECURE DATA ENCRYPTION IN SHARED STORAGE USING NAMESPACES

CROSS-REFERENCE TO RELATED APPLICATION

This application is a continuation of U.S. patent application Ser. No. 14/081,796, filed on Nov. 15, 2013, the entire contents of which are incorporated herein by reference.

BACKGROUND

In distributed computing, components located on networked computers interact with each other in order to achieve a common goal. The networked components, which may include storage resources, can generally be shared by multiple users, particularly in the distributed computing paradigm known as "cloud computing." In this context, data security is an important concern in the sharing of storage resources, since multiple users have access to the same data storage device. This is typically the case even though the users may otherwise have no relationship to each other.

Generally, data encryption is used to allow different users to share a particular storage device while securing the data between the different users. For example, in a data storage device used in a distributed computing system, a different range of logical block addresses (LBAs) and corresponding access key (or a personal identification number (PIN)) may be assigned to each user that has access to the data storage device. The access key is generally used by the controller of the data storage device to encrypt data stored in the LBA range to which the access key corresponds. Furthermore, the controller of the data storage device is configured to allow the user access to a particular LBA range only if the user can provide the access key that corresponds to that particular LBA range. In this way, a user is prevented from accessing an LBA range of a different user.

However, in the above-described technique, a user is still able to access any LBA range of the storage device if the corresponding access key is known. Furthermore, when an LBA range is unlocked incorrectly, data stored in the LBA range is exposed to any user. Consequently, the security of data stored in an LBA range of the data storage device is limited to how securely the access key for that LBA range is stored and transmitted and how programs in hosts utilize the security protocol. In light of the above, there is a need in the art for more robust security of shared storage resources in distributed computing systems.

SUMMARY

Embodiments provide systems and methods for robust security when sharing storage resources in a distributed computing system.

An information processing system according to an embodiment comprises a host system and a storage system. The storage system includes a non-volatile storage device divided into blocks that are addressable using physical block addresses and a controller configured to: (i) receive a command issued by the host system, the command including an access key for a namespace and a virtual block address, (ii) convert the virtual block address to a physical block address using a mapping associated with the namespace, and (iii) access the nonvolatile storage device at the physical block address converted from the virtual block address.

In some embodiments, the host system connected to the storage system has one or more virtual machines running therein, and each of the virtual machines is able to independently access the shared storage system.

A method of executing a read for a client application, e.g., a virtual machine, running in a host computer that is connected to a storage system having a nonvolatile storage device divided into blocks that are addressable using physical block addresses, according to one embodiment, includes the steps of determining an access key associated with a namespace to be accessed when executing the read, issuing a read command that includes the access key, and reading data from the nonvolatile storage device at physical block addresses that are determined from a mapping for the namespace.

A method of executing a write for a client application running in a host computer that is connected to a storage system having a nonvolatile storage device divided into blocks that are addressable using physical block addresses, according to one embodiment, includes the steps of determining an access key associated with a namespace to be accessed when executing the write, issuing a write command that includes the access key, and writing data in the nonvolatile storage device at physical block addresses that are determined from a mapping for the namespace.

BRIEF DESCRIPTION OF THE DRAWINGS

For clarity, identical reference numbers have been used, where applicable, to designate identical elements that are common between figures. It is contemplated that features of one embodiment may be incorporated in other embodiments without further recitation.

DETAILED DESCRIPTION

Embodiments provide systems and methods for robust security when sharing storage resources in a distributed computing system. According to one embodiment, different hosts in the distributed computing system share a storage resource while data stored by each host are isolated from data stored by the other hosts. Specifically, access to physical block addresses of storage locations within the shared storage resource is restricted by the use of multiple namespaces associated with the shared storage resource. Each namespace is defined by a set of logical block addresses that map to physical block addresses of storage locations in the shared storage resource, where each physical block address in the shared storage resource is allocated to no more than a single namespace. To access a particular physical block address in the shared storage resource, a host issues a command to the data storage device that includes a namespace identification code that corresponds to a targeted namespace and an access key for authentication to access the namespace. The access key indicates the host has been previously granted access to the namespace to which the particular physical data block address is allocated. Without the access key for a namespace, a host that has not been granted access to the namespace cannot access any physical block addresses allocated to that namespace.

Figure 1:
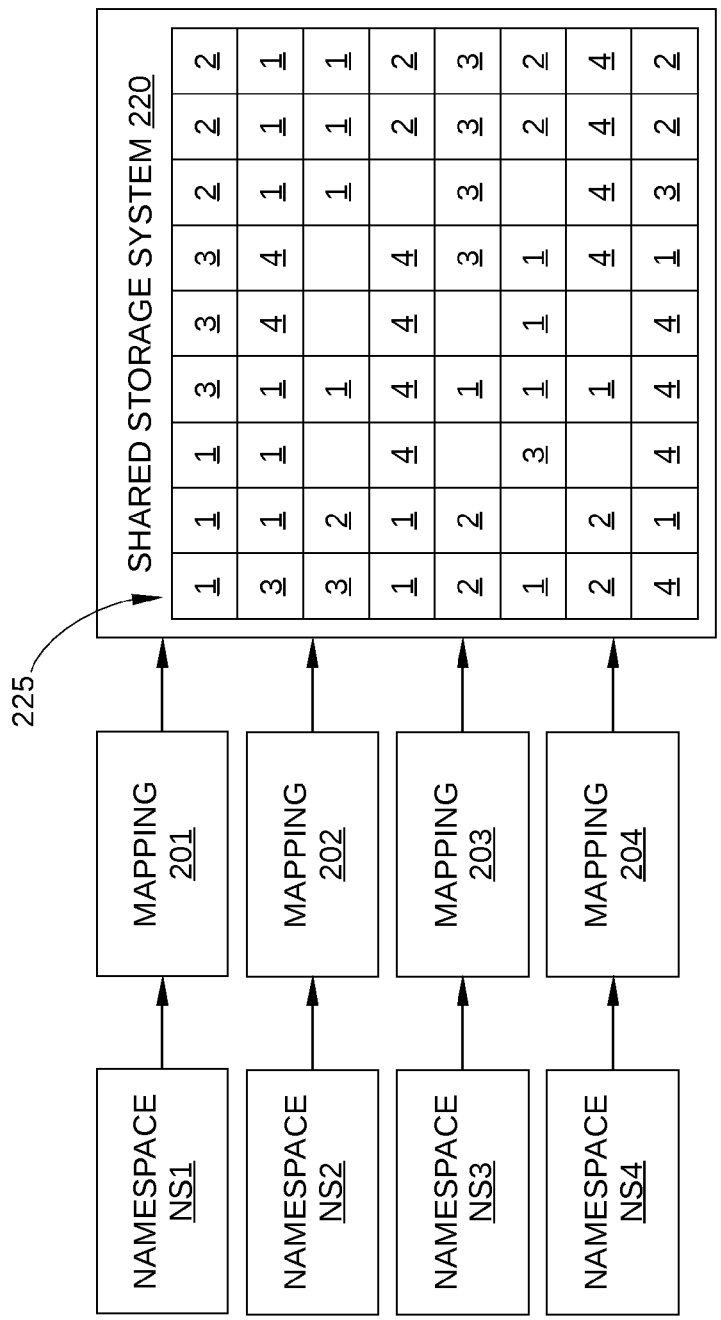
FIG. 1 schematically illustrates mappings of different namespaces to physical block addresses of storage locations within a shared storage system, according to an embodiment.

FIG. 1 schematically illustrates mappings of different namespaces to physical block addresses of storage locations within a shared storage system, according to an embodiment. In FIG. 1, four namespaces, NS1-NS4 are shown, each having a respective mapping 201-204. Each of mappings 201-204 is a mapping data structure that maps logical block addresses (hereinafter "LBAs") of a particular namespace to physical block addresses (hereinafter "PBAs") of a plurality of storage locations 225 within a shared storage system 220. Thus, mapping 201 maps logical block addresses of NS1 to a portion of the PBAs in shared storage system 220, mapping 202 maps logical block addresses of NS2 to a portion of the PBAs in shared storage system 220, mapping 203 maps logical block addresses of NS3 to a portion of the PBAs in shared storage system 220, and mapping 204 maps logical block addresses of NS4 to a portion of the PBAs in shared storage system 220.

By way of illustration, in FIG. 1 storage locations 225 that are mapped from NS1 in mapping 201 are labeled "1," storage locations 225 that are mapped from NS2 in mapping 202 are labeled "2," storage locations 225 that are mapped from NS3 in mapping 203 are labeled "3," and storage locations 225 that are mapped from NS4 in mapping 204 are labeled "4." Free storage locations are not labeled. In one embodiment, each of mappings 201-204 are maintained as tables, each entry in these tables defining a mapping between a logical block address of a namespace to a particular PBA.

Figure 2:
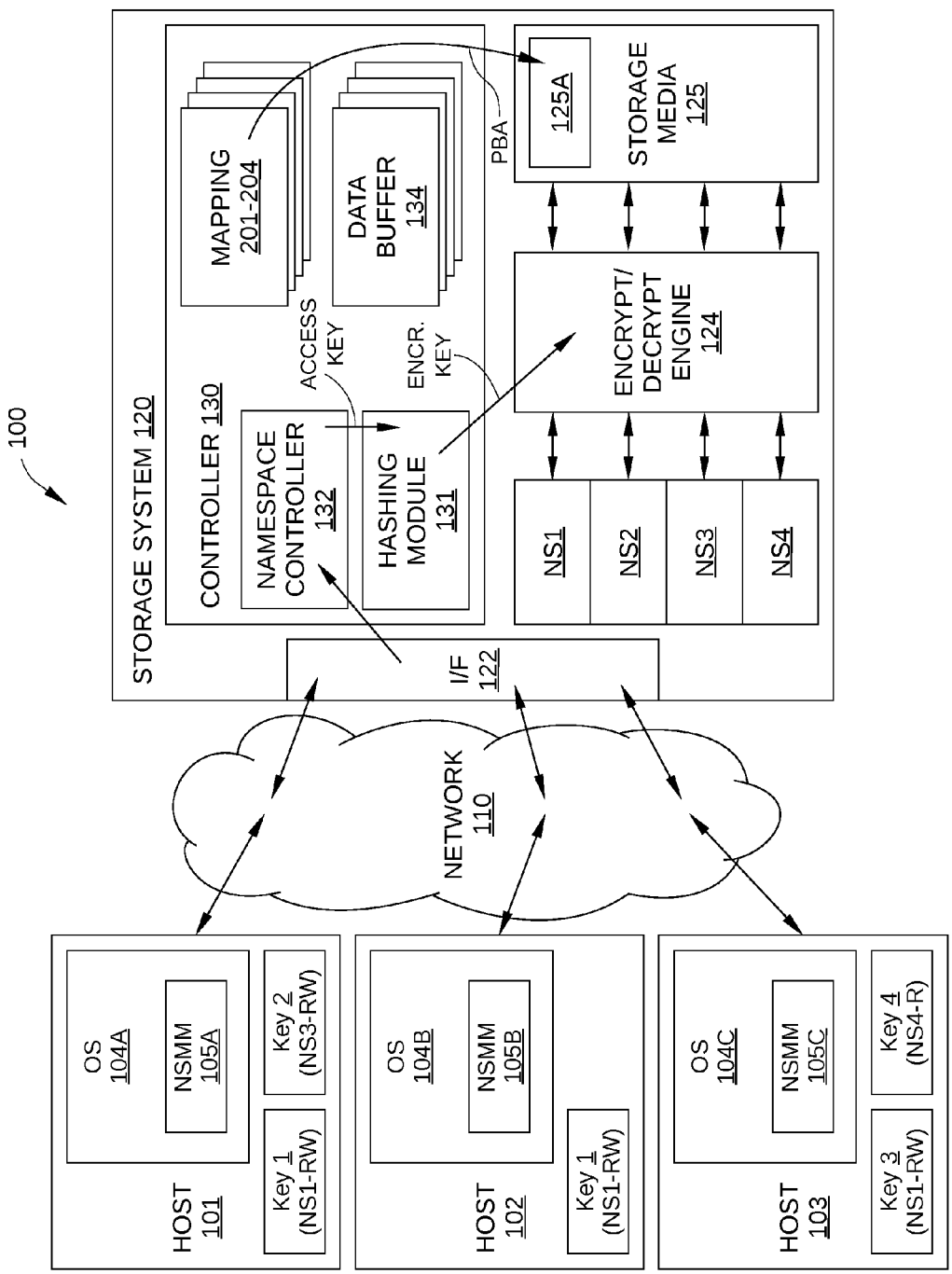
FIG. 2 is a block diagram of a computing system in which embodiments may be implemented.

FIG. 2 is a block diagram of a computing system 100 in which embodiments may be implemented. Computing system 100 includes one or more host computers (e.g., hosts 101, 102, and 103) connected to a storage system 120 via a network 110, which in one embodiment, is a storage area network. In the embodiment illustrated in FIG. 2, computing system 100 includes three hosts, but in other embodiments, computing system 100 may include any number of hosts. Each host computer is configured with system software (e.g., an operating system) that manages input/output operations (IOs) issued to storage system 120. The system software for each host computer includes a namespace management module (NSMM) that examines IOs that target storage system 120 and issue IOs that each includes a key for accessing a particular namespace specified in the IO (hereinafter referred to as "access key"). Thus, host 101 includes an OS 104A and an NSMM 105A, host 102 includes an OS 104B and an NSMM 105B, and host 103 includes an OS 104C and an NSMM 105C.

According to some embodiments, a host computer issuing an IO to a particular namespace accesses the namespace using an access key for the namespace, which is created when the host computer is initially given access to the namespace by storage system 120. The host computer may temporarily retain this access key in memory or may request users to enter the access key each time the access key is needed. The host computer appends the access key to an IO issued to storage system 120 that targets the namespace corresponding to the access key. It should be recognized that a host computer may be given access to more than one namespace. Thus, hosts 101, 102, and 103 may each include one or more access keys for one or more of namespaces NS1-NS4. For example, key 1 provides host 101 with read-write access to namespace NS1; key 2 provides host 101 with read-write access to namespace NS3; key 3 provides a host with read-write access to namespace NS1; and key 4 provides a host with read-only access to namespace NS4.

A host computer may have access to multiple namespaces in storage system 120. For example, as shown in FIG. 2, host 101 includes key 1 and key 2, and therefore has read-write access to namespace NS1 and namespace NS3. In addition, multiple hosts may have access to the same namespace via an identical access key. For example, as shown in FIG. 2, host 101 and host 102 each include key 1, and therefore both have read-write access to namespace NS1. In some embodiments, multiple hosts may have access to the same namespace via different access keys. For example, host 101 includes key 1 and host 103 includes key 3, and therefore both have read-write access to namespace NS1, but via different access keys. Thus, in embodiments in which namespace access keys are also used for encryption of data in storage system 120, host 101 cannot read data stored in namespace NS1 for host 103 and vice-versa. In some embodiments, a host may have different access privileges for different namespaces. For example, as shown in FIG. 2, host 103 includes key 3 and key 4, and therefore has read-write access to namespace NS1 but only read-access to namespace NS4. Furthermore, any other feasible combination of read-access, write-access, and read-write access keys may be granted to hosts 101, 102, and 103.

Storage system 120 is a shared storage resource for hosts 101, 102, and 103, and includes a controller 130, a communications interface 122, an encrypt/decrypt engine 124, and storage media 125. Storage system 120 may be any technically feasible non-volatile storage resource, such as a hard disk or a flash memory device, and may be located remotely from one or all of hosts 101, 102, and 103.

Communications interface 122 is configured to receive commands and/or data from hosts 101, 102, or 103 and to facilitate transmission of data to hosts 101, 102, and 103 from storage system 120. Namespaces NS1, NS2, NS3, and NS4 may be substantially similar to namespaces NS1-NS4 illustrated in FIG. 1, and each include a virtual block address space, also referred to as a logical block (LBA) space. Each LBA space includes a plurality of virtual blocks, or LBA blocks. For example, in some embodiments, each of namespaces NS1, NS2, NS3, and NS4 may be configured with an LBA space of 1 TB of data storage capacity. Thus, the physical data storage locations of storage media 125, i.e., the physical block addresses, are individually assigned to a particular one of namespaces NS1, NS2, NS3, and NS4. Mappings 201-204 each map logical block addresses of namespaces NS1-NS-4 to PBAs of storage locations within storage media 125, respectively. In some embodiments, each namespace may include the same range of LBA address values or overlapping LBA address values. Because the access requests issued to storage system 120 by a host includes not only an LBA to be accessed, but also an access key that corresponds to a particular one of namespaces NS1-NS4, each LBA to be accessed can be distinguished from identical LBA address values in the other namespaces. Furthermore, in embodiments in which storage system 120 includes one or more solid-state memory devices, one or more of namespaces NS1, NS2, NS3, and NS4 can be dynamically sized, and therefore are not fixed in size.

Encrypt/decrypt engine 124 is configured to encrypt data stored in storage media 125 and decrypt data retrieved from storage media 125. The encrypt/decrypt engine 124 encrypts data using encryption key which corresponds to an access key and decrypts data using decryption key which corresponds to an access key. In some embodiments, encrypt/decrypt engine 124 is configured to receive an access key from controller 130 (described below), hashes the access key, and uses the hashed access key as an encryption key (a media encryption key, MEK) for performing encryption and decryption. Storage media 125 can include any technically feasible non-volatile data storage device, such as one or more magnetic hard disk drives, one or more solid-state drives (e.g., NAND flash), or a combination of each. Typically, storage media 125 includes a media controller 125A, such as a microprocessor-based controller or other control circuitry, that is configured to perform the physical operations of reading data from and writing data to storage media 125. In embodiments in which encrypted data are stored on storage media 125, media controller 125A generally receives encrypted data from encrypt/decrypt engine 124 for write operations. For read operations, media controller 125A reads encrypted data from storage media 125 and transmits the encrypted data to encrypt/decrypt engine 124 for decryption.

Controller 130 controls the operation of storage system 120 so that data stored for each one of hosts 101, 102, and 103 are encrypted and isolated from any other data stored in storage system 120. Thus, according to embodiments described herein, controller 130 accesses physical memory locations in storage media 125 in response to access requests issued by any of hosts 101, 102, or 103. This access may include read or write commands and is executed when such commands include an appropriate namespace identification code, an access key, and one or more virtual block address, such as logical block addresses (LBAs).

Controller 130 includes a hashing module 131, a namespace controller 132, multiple mappings 201-204 (one for each of namespaces NS1-NS4), and multiple namespace data buffers 134 (one for each of namespaces NS1-NS4). Hashing module 131 is configured to perform a hash on access keys received by storage system 120 to generate encryption keys. Namespace controller 132 examines the access key appended to an IO and selects one of mappings 201-204 associated with the access key using the procedures described below. Each of namespace data buffers 134 is configured to temporarily store data during encrypt/decrypt processing.

In operation, namespace controller 132 is configured to receive a request from one of hosts 101, 102, or 103 for access to one of namespaces NS1, NS2, NS3, or NS4. For example, the request may be a read command or a write command, and in some embodiments includes a namespace identification code that corresponds to the targeted namespace, an access key to get an authentication to access the namespace (e.g., key 1, key 2, etc.) and one or more virtual block addresses, such as an LBA range. Namespace controller 132 is further configured to convert the one or more virtual block addresses to physical block addresses of storage media 125 using a mapping associated with the namespace identification code. For example, in some embodiments namespace controller 132 is configured to consult one of mappings 201-204 for the namespace that corresponds to the namespace identification code and the access key included in the access request. The consulted mapping indicates which physical block addresses of storage media 125 correspond to the one or more virtual block addresses or LBAs included in the access request. Namespace controller 132 then accesses the physical block addresses indicated by the appropriate mapping 201-204 by either reading data from the indicated physical block addresses or writing data to the indicated physical block addresses. In embodiments in which encrypted data are stored, namespace controller 132 uses the hashed access key as an encryption key for encrypting data to be written to and decrypting data read from storage media 125. In addition data to be encrypted and data to be decrypted are temporarily stored in data buffer 134

Figure 3:
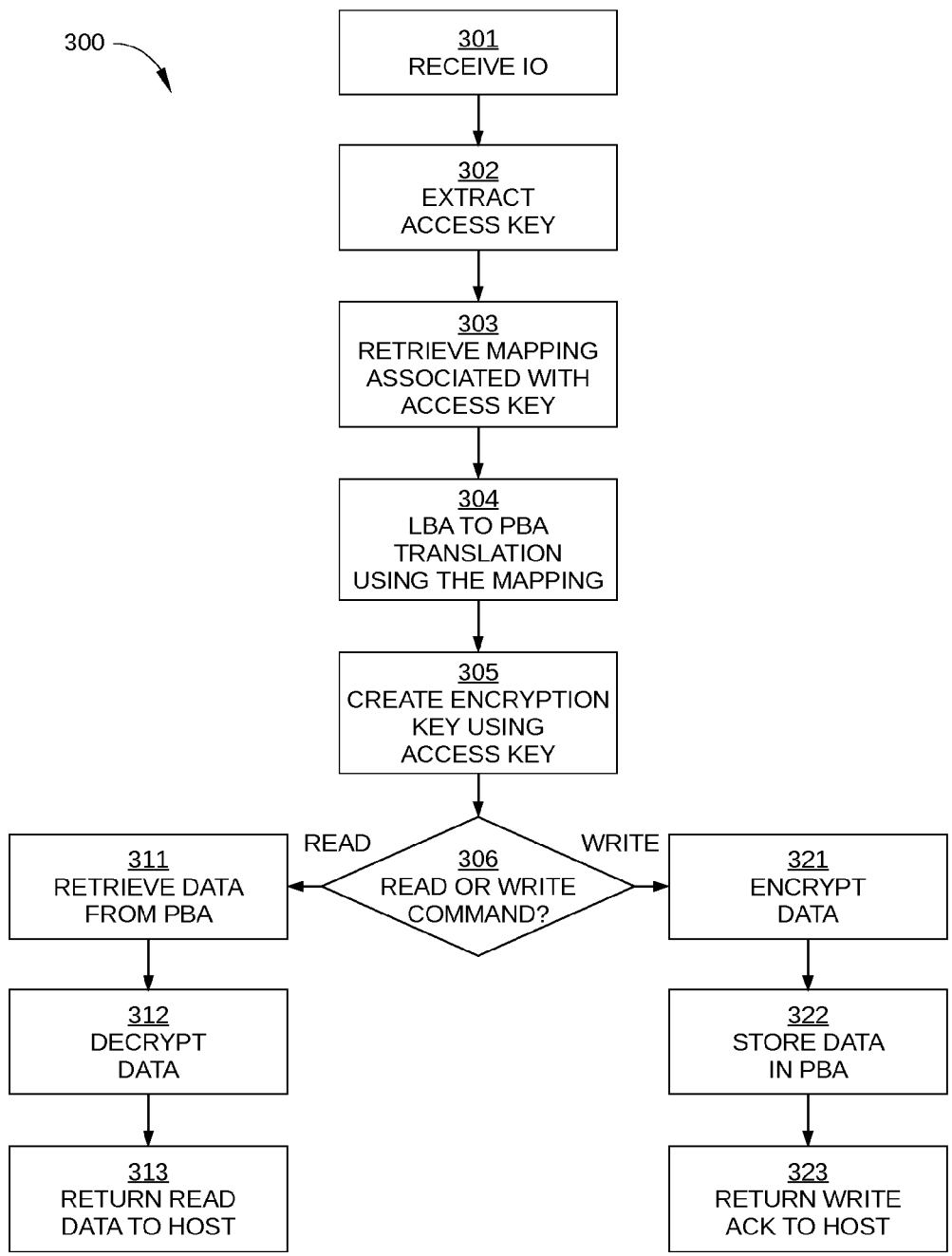
FIG. 3 sets forth a flowchart of method steps carried out by a storage system when an input/output operation is received from a host computer, according to some embodiments.

FIG. 3 sets forth a flowchart of method steps carried out by a storage system when an IO is received from a host computer, according to some embodiments. Although the method steps are described in conjunction with storage system 120 of computing system 100 in FIG. 2, persons skilled in the art will understand that the method in FIG. 3 may be performed with other types of computing systems.

As shown, a method 300 begins at step 301, where controller 130 of storage system 120 receives an IO from a host computer, (e.g., host 101). In step 302, controller 130 extracts a namespace identification code and an access key from the 10. In step 303, controller 130 retrieves a mapping data structure associated with the namespace identification code when the controller 130 authenticates the association between the namespace identification code and the access key (e.g., mapping 201). In step 304, controller 130 performs LBA to PBA translation using the mapping retrieved in step 303. In step 305, controller 130 creates an encryption key using the access key extracted in step 302. In step 306, controller 130 determines whether the IO includes a read command or a write command. If the IO includes a read command, method 300 proceeds to step 311, and if the IO includes a write command, method 300 proceeds to step 321. Only hosts in computing system 100 that know the correct namespace identification code for a namespace can have access to the namespace, even if an access key for the namespace has been compromised and is known by unauthorized hosts. Thus, data stored in the namespace is not exposed to unauthorized users by an incorrect unlock operation due to software bugs or other malfunctions of a host.

In step 311, controller 130 reads data from the PBAs translated from LBAs in step 304. In step 312, controller 130 decrypts the data read in step 311 using encrypt/decrypt engine 124. In step 313, controller 130 returns the decrypted data to the host computer.

In step 321, controller 130 encrypts data included in the IO using encrypt/decrypt engine 124. In step 322, controller 130 stores the data in the PBAs translated from LBAs in step 304. In step 323, controller 130 returns a write acknowledgement to the host computer.

Figure 4:
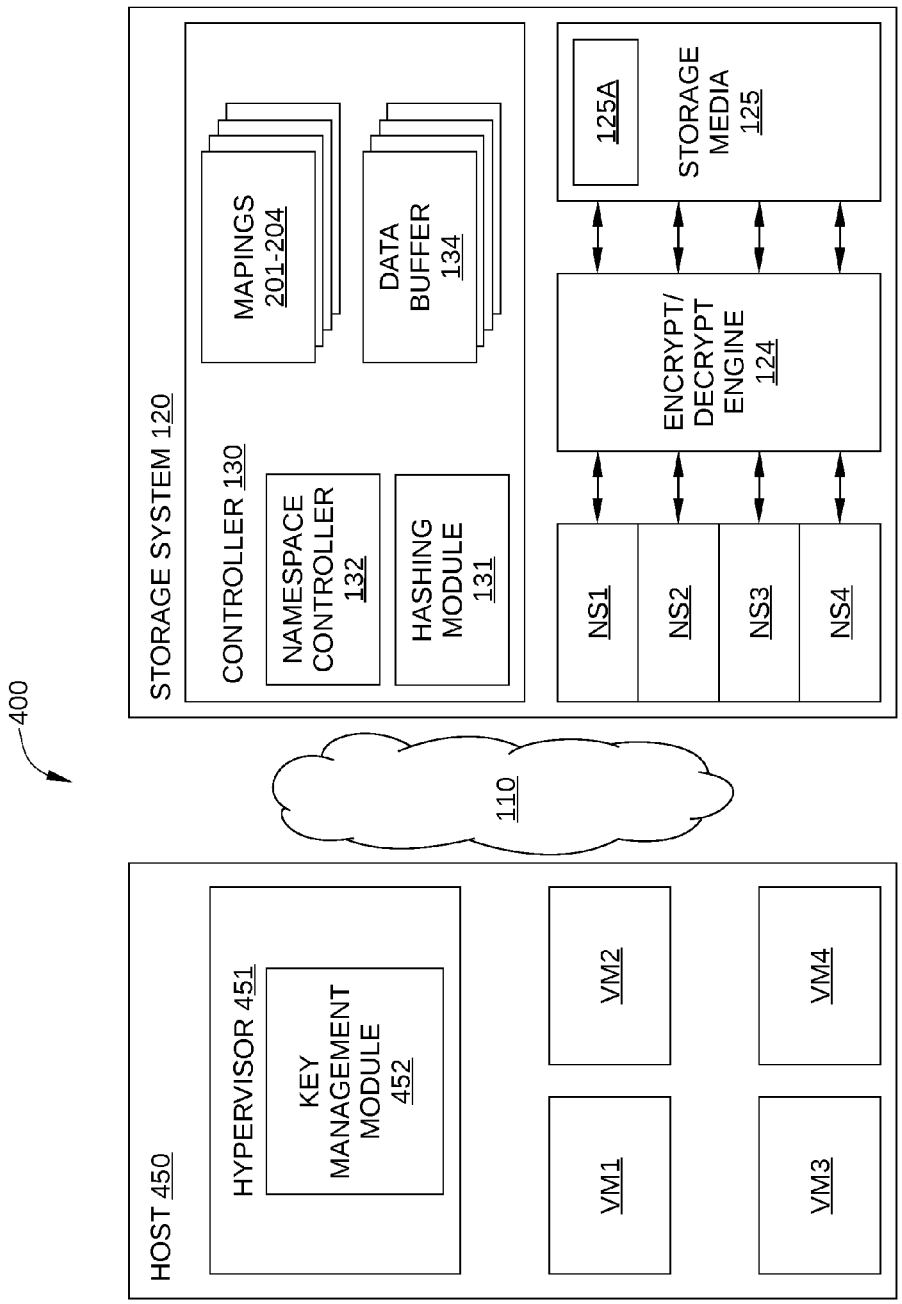
FIG. 4 is a block diagram of a computing system which includes virtual machines in which embodiments may be implemented.

FIG. 4 is a block diagram of a computing system 400 in which embodiments may be implemented. Computing system 400 includes a host computer (e.g., host 450) that includes a system software (e.g., a hypervisor 451) for supporting execution of virtual machines, and is connected to storage system 420 via network 110. In the embodiment illustrated herein, four virtual machines VM1-VM4 are shown as being executed in host 450. Each of the virtual machines are programmed to have the functionality of a stand-alone physical computer. For simplicity, it is assumed that VM1 is programmed to have the functionality of host 101, VM2 programmed to have the functionality of host 102, VM3 programmed to have the functionality of host 103, and VM4 programmed to have the functionality of a fourth host computer. In addition to typical operations carried out by a hypervisor, hypervisor 451 is also configured to generate and track namespace identification codes for each of namespaces NS1-NS4. In addition, hypervisor 451 is configured to provide an appropriate namespace identification code to a virtual machine when the virtual machine requests the creation of a namespace in storage system 420. Thus, when the virtual machine subsequently requests access to this namespace, the virtual machine references the namespace using the namespace identification code, which acts as an additional layer of security for data stored in storage system 420. Without the appropriate namespace identification code for a particular namespace, a virtual machine in computing system 400 cannot request an access key from hypervisor 451 and therefore cannot access that particular namespace.

Figure 5:
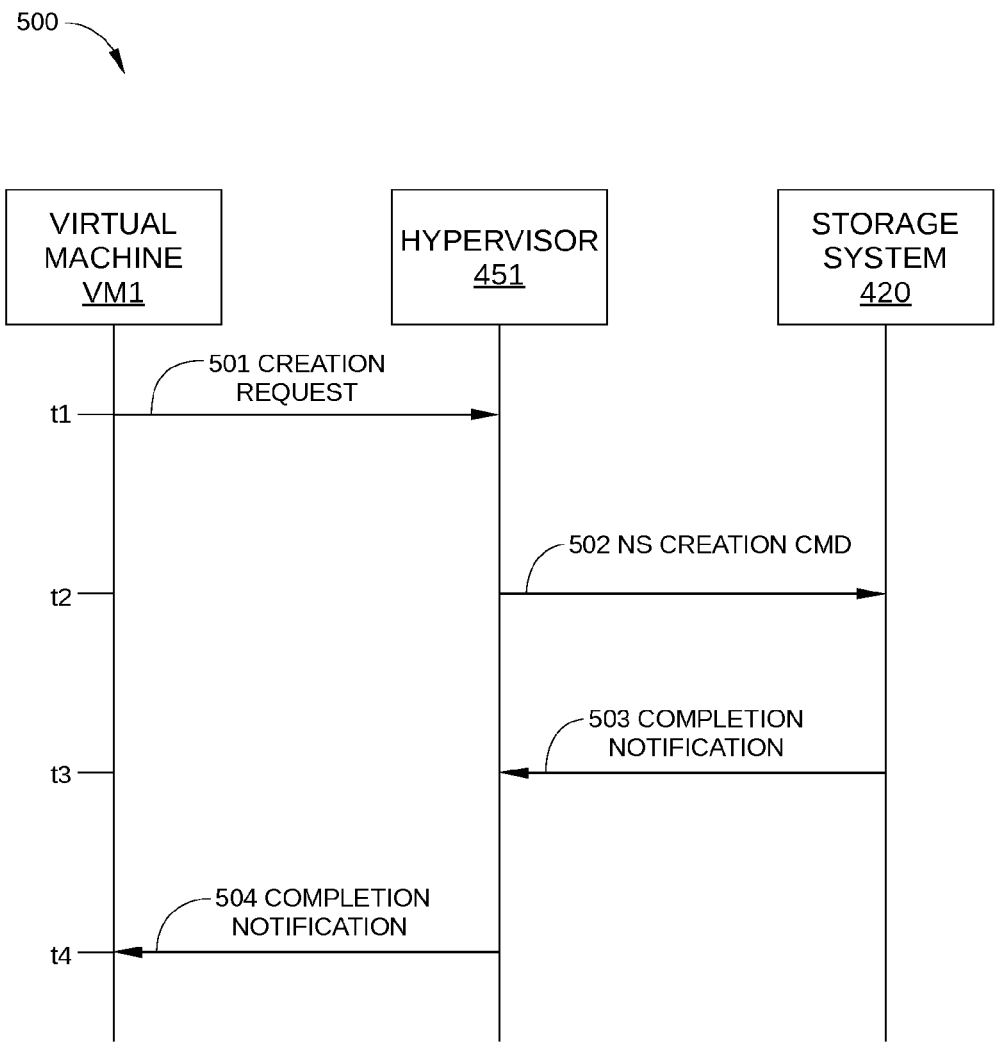
FIG. 5 is a sequence diagram illustrating the creation of a namespace in a storage system for a virtual machine, according to one or more embodiments.

FIG. 5 is a sequence diagram 500 illustrating the creation of a namespace in storage system 420 for virtual machine VM1, according to one or more embodiments. At time t1, virtual machine VM1 sends a creation request 501 to hypervisor 451 for a namespace to be created in storage system 420 for use by virtual machine VM1. In some embodiments, creation request 501 also includes a desired size of the namespace. At time t2, hypervisor 451 sends a namespace creation command 502 to storage system 420. In some embodiments, key management module 452 generates an access key for the namespace being created and includes the access key in namespace creation command 502. In this way, storage system 420 is notified of the correlation between access keys and namespaces. At time t3, controller 130 in storage system 420 creates namespace N2 in storage system 420 by mapping virtual block addresses, such as a range of LBAs, to a number of PBAs, and sends hypervisor 451 a completion message 503. This mapping is retained in by controller 130 (e.g., as mapping 201). In addition, storage system 420 retains the access key included in namespace creation command 502 or a hashed access key for future authorization of access to the newly created namespace. At time t4, hypervisor 451 sends a completion notification 504 to virtual machine VM1. Included in completion notification 504 is a namespace identification code that virtual machine VM1 can subsequently use to request an access key to namespace NS2 for read and/or write operations. A procedure similar to that illustrated in sequence diagram 500 may be used to delete namespace NS2 from storage system 420 when requested by virtual machine VM1.

Hypervisor 451 uses key management module 452 to generate the namespace identification code included in completion notification 504 and to maintain the access keys in association with the namespace identification codes for the namespaces. In this way, a virtual machine in computing system 400 can only access a namespace in storage system 420 if the virtual machine knows the namespace identification code of the namespace and is authenticated by the hypervisor 451 to access the access key.

Figure 6:
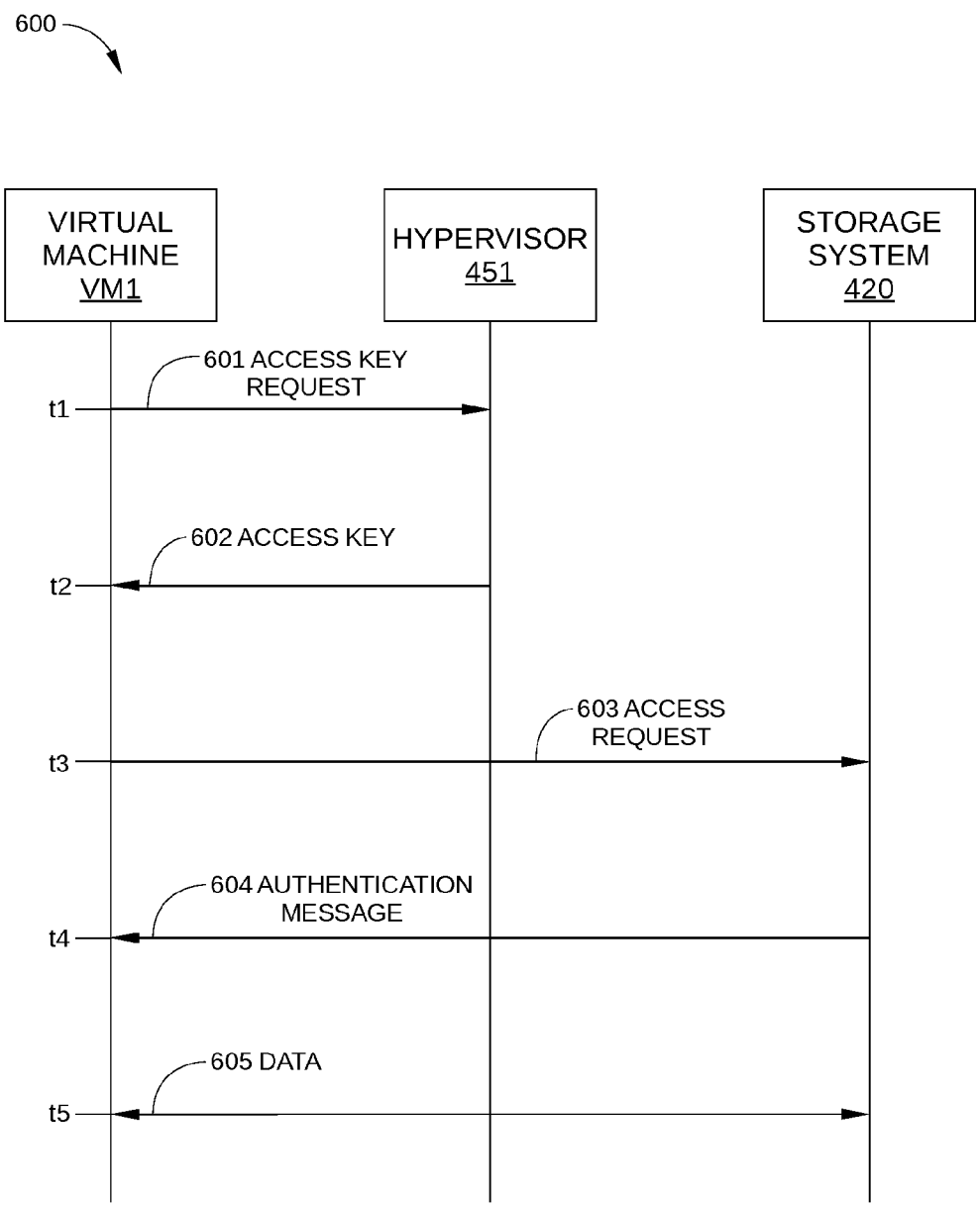
FIG. 6 is a sequence diagram illustrating a virtual machine accessing a namespace in a storage system, according to one or more embodiments.

In operation, hypervisor 451 receives a key request from one of virtual machines VM1-VM4 for access to one of namespaces NS1-NS4 in storage system 420, authenticates the virtual machine and provides the appropriate access key to the virtual machine. If the virtual machine is not authenticated by the hypervisor, the hypervisor 451 does not provide the access key to the virtual machine. This procedure is illustrated in FIG. 6. FIG. 6 is a sequence diagram 600 illustrating virtual machine VM1 accessing a namespace in storage system 420, according to one or more embodiments.

At time t1, virtual machine VM1 sends an access key request 601 to hypervisor 451 for the appropriate access key for namespace NS2. Access key request 601 includes the namespace identification code for namespace NS2, otherwise the access key request 601 is rejected by hypervisor 451. Furthermore, access key request 601 may include an authentication key of VM1, otherwise the authentication is rejected by hypervisor 451. In this way, only virtual machines in computing system 400 that have been given the correct namespace identification code for namespace NS2 can have access to namespace NS2, even if an access key for namespace NS2 has been compromised and is known by unauthorized virtual machines. Thus, data stored in the namespace is not incorrectly exposed to every virtual machines due to an erroneous unlock operation due to software bugs or malfunctions. In addition, access key request 601 may include what type of access is requested by virtual machine VM1, such as read-write access, read-only access, or write-only access. Hypervisor 451 can then provide an access key to virtual machine VM1 that informs storage system 420 of the type of access being granted to virtual machine VM1.

At time t2, hypervisor 451 consults key management module 452 (shown in FIG. 4) to retrieve the appropriate access key and sends said access key 602 to virtual machine VM1.

At time t3 virtual machine VM1 sends an access request 603 to storage system 420. In some embodiments, access request 603 is a read IO or write IO that includes access key 602 and one or more virtual block addresses to be accessed in namespace NS2, such as an LBA range. In some embodiments, the one or more virtual block addresses are indicated by a starting LBA value and an offset value.

At time t4, storage system 420 performs a search for a namespace associated with access key 602. When access key 602 matches the access key corresponding to namespace NS2 that was previously provided by hypervisor 451, storage system 420 returns an authentication message 604 to virtual machine VM1 indicating that access key 602 allows access to namespace NS2. Storage system 420 may also use a hashed access key which is generated from access key 602 for the search. When the hashed access key matches the hashed access key that was previously hashed from the access key corresponding to namespace NS2 that was previously provided by hypervisor 451, storage system 420 returns an authentication message 604 to virtual machine VM1 indicating that access key 602 allows access to namespace NS2

At time t5, storage system 420 accesses the mapping for the namespace NS2 and converts the virtual block addresses or LBA ranges in access request 603 to PBAs of storage media 125 using the mapping. For example, when access key 602 corresponds to namespace NS2, storage system 420 consults mapping 202. In this way, storage system 420 determines the PBAs of storage media 125 that are to be accessed using the LBAs included in access request 603. Storage system 420 then performs the operation specified in access request 603 on the PBAs so determined.

When access request 603 is a write 10, storage system 420 buffers the data to be written in data buffer 134 for namespace NS2, hashes access key 602 to create an encryption key, and encrypts the data to be written with encrypt/decrypt engine 124 using the encryption key. The encrypted data are then written to the appropriate PBAs in namespace NS2.

When access request 603 is a read 10, storage system 420 reads encrypted data from the appropriate virtual block addresses in namespace NS2 and buffers the encrypted data in data buffer 134 for namespace NS2. Storage system 420 also hashes access key 602 to create a decryption key that encrypt/decrypt engine 124 uses to decrypt the encrypted data in data buffer 134. After decryption, storage system 420 sends the data 605, i.e., the decrypted data, to virtual machine VM1.

In the embodiments described above, storage system 420 is connected to the host computer(s) over a network. In alternative embodiments, storage system 420 may be directly connected to the host computer(s) and may serve as a dedicated storage device for the host computer(s).

While the foregoing is directed to specific embodiments, other and further embodiments may be devised without departing from the basic scope thereof, and the scope thereof is determined by the claims that follow.

We claim:

1. A storage system comprising:
a controller; and
a nonvolatile memory that is configured by the controller with a plurality of namespaces, wherein
the plurality of namespaces comprises first and second namespaces that are unlocked separately, the first namespace being unlocked using a first key and the second namespace being unlocked separately using a second key that is different from the first key, and
the controller:
(i) extracts a first namespace identification code from a first read/write command issued by a first host system,
(ii) dynamically generates the first key for transforming data to be written in or read from the first namespace based on an access key contained in the first read/write command, wherein the access key contained in the first read/write command is the same access key that was associated with the first namespace identification code when the first namespace was provisioned for access by the first host system, and
(iii) accesses the first namespace corresponding to the first namespace identification code to write data in or read data from the first namespace.

2. The storage system of claim 1, wherein
the controller:
(i) extracts a second namespace identification code from a second read/write command issued by a second host system,
(ii) dynamically generates the second key for transforming data to be written in or read from the second namespace based on an access key contained in the second read/write command, wherein the access key contained in the second read/write command is the same access key that was associated with the second namespace identification code when the second namespace was provisioned for access by the second host system, and
(iii) accesses the second namespace corresponding to the second namespace identification code to write data in or read data from the second namespace.

3. The storage system of claim 1, wherein
the first key encrypts data to be written in or read from the first namespace.

4. The storage system of claim 1, wherein
the first key decrypts data to be written in or read from the first namespace.

5. The storage system of claim 1, wherein
the plurality of namespaces comprises third and fourth namespaces that are unlocked separately, the third namespace being unlocked using a third key and the fourth namespace being unlocked separately using a fourth key that is different from the third key.

6. The storage system of claim 5, wherein
the controller:
(i) extracts a third namespace identification code from a third read/write command issued by a third host system,
(ii) dynamically generates the third key for transforming data to be written in or read from the third namespace based on an access key contained in the third read/write command, wherein the access key contained in the third read/write command is the same access key that was associated with the third namespace identification code when the third namespace was provisioned for access by the third host system, and
(iii) accesses the third namespace corresponding to the third namespace identification code to write data in or read data from the third namespace.

7. The storage system of claim 1, further comprising:
an encrypt/decrypt engine which is configured to encrypt data stored in the nonvolatile memory and decrypt data retrieved from the nonvolatile memory.

8. The storage system of claim 7, wherein
the controller is configured to send the generated first key to the encrypt/decrypt engine for the encrypt/decrypt engine to encrypt data stored in the nonvolatile memory using the generated first key and decrypt data retrieved from the nonvolatile memory using the generated first key.

9. The storage system of claim 1, wherein
the nonvolatile storage device comprises one of a NAND flash or a hard disk drive.

10. The storage system of claim 1, wherein
the first host system includes one or more client applications and the first read/write command issued by the first host system is issued by one of the one or more client applications.

11. The storage system of claim 10, wherein
at least one client application is a virtual machine.

12. The storage system of claim 11, wherein
the first host system includes system-level virtualization software that is configured to maintain an access key for each of plurality of namespaces.

13. The storage system of claim 12, wherein
the system-level virtualization software is configured to determine the access key for a particular namespace in response to a namespace identification code received from a virtual machine.

* * * * *